Figure 1:
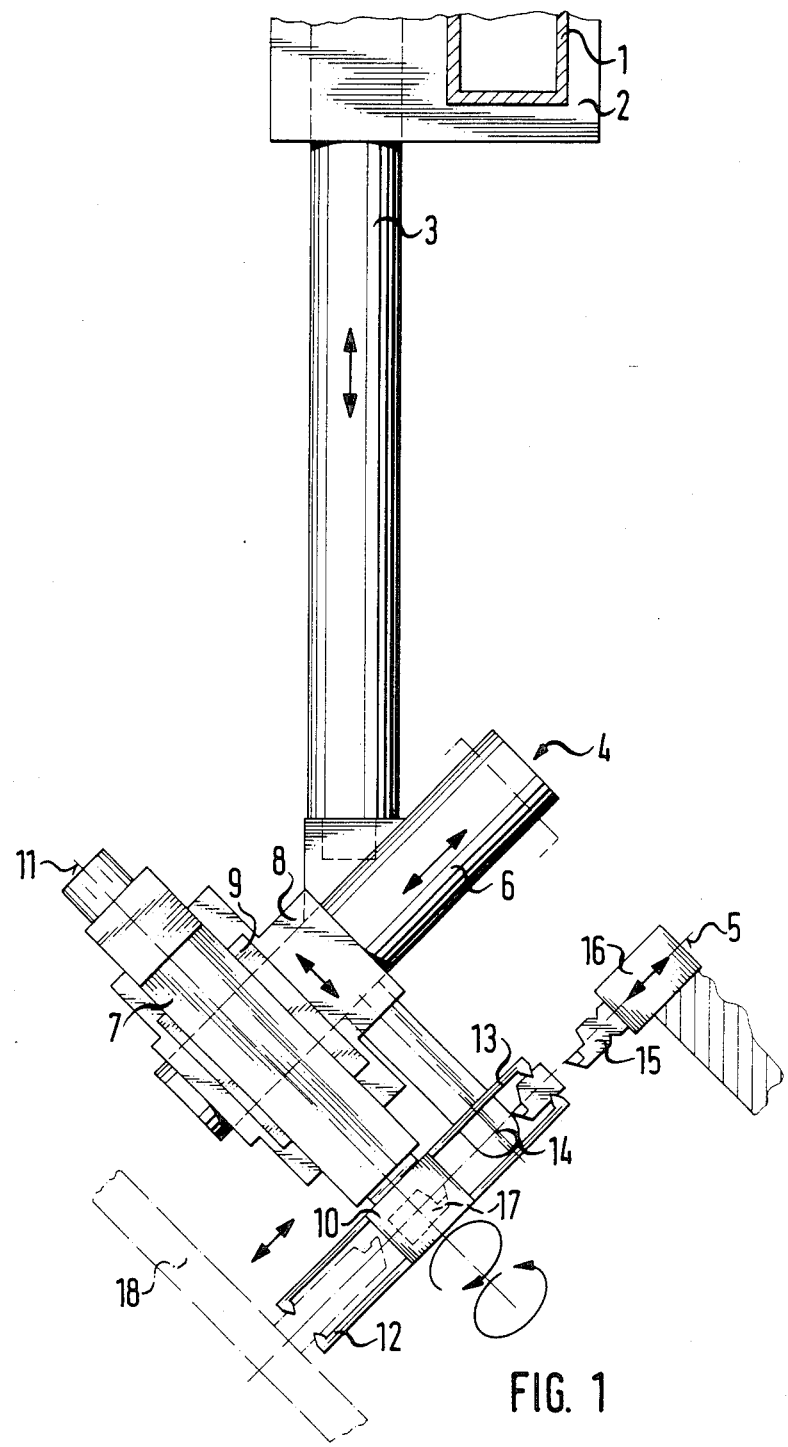

United States Patent [19]

Dormehl

[11] Patent Number: 4,713,875
[45] Date of Patent: Dec. 22, 1987

[54] TOOL CHANGER

[75] Inventor: Erich Dormehl, Allendorf/Nordeck, Fed. Rep. of Germany

[73] Assignee: Heyligenstaedt & Comp. Werkzeugmaschinenfabrik GmbH, Giessen, Fed. Rep. of Germany

[21] Appl. No.: 936,543

[22] Filed: Nov. 25, 1986

[30] Foreign Application Priority Data

Nov. 25, 1985 [DE] Fed. Rep. of Germany ....... 3541563

[51] Int. Cl.[4] .......................................... B23Q 3/157
[52] U.S. Cl. ...................................................... 29/568
[58] Field of Search ................ 29/568; 82/36 B, 36 A

[56] References Cited

U.S. PATENT DOCUMENTS

| 3,667,114 | 6/1972 | Smith et al. | 29/568 |
| 3,744,124 | 7/1973 | Gardner | 29/568 |
| 3,807,011 | 4/1974 | Harman et al. | 29/568 |
| 3,867,756 | 2/1975 | Koch et al. | 29/568 |
| 3,925,877 | 12/1975 | Junike et al. | 29/568 |
| 4,020,545 | 5/1977 | Slavinski et al. | 29/568 |
| 4,428,109 | 1/1984 | Seeger | 29/568 |
| 4,497,410 | 2/1985 | Coate | 29/568 X |
| 4,577,389 | 3/1986 | Shultz | 29/568 |
| 4,601,094 | 7/1986 | Myers | 29/568 |
| 4,654,955 | 4/1987 | Mathie | 29/568 |

FOREIGN PATENT DOCUMENTS

| 1602810 | 6/1970 | Fed. Rep. of Germany | 29/568 |
| 2013403 | 10/1971 | Fed. Rep. of Germany | 29/568 |
| 805127 | 12/1958 | United Kingdom | 29/568 |
| 2031777 | 7/1978 | United Kingdom | 29/568 |
| 614926 | 7/1978 | U.S.S.R. | 29/568 |

Primary Examiner—William R. Briggs
Attorney, Agent, or Firm—Wegner & Bretschneider

[57] ABSTRACT

A tool changer for a lathe with inclined bed has at a ram (3) that is movable into the lathe a first guideway (6) running parallel to the plane of the machine bed (5). On the first guideway (6) there is a tool changer head (7) holding a double gripper head (10) that is pivotable about an axis (11) arranged rectangularly to the plane of the machine bed (5) and movable along a guide (9) rectangularly to the plane of the machine bed (5). This enables the tool changer (4) to serve upper and lower carriages with different tool-systems and to shift magazine ledges.

4 Claims, 7 Drawing Figures

TOOL CHANGER

This invention relates to a tool changer for a lathe with inclined bed with at least one tool carriage with a drumtype turret arranged on an upper bed as well as another tool carriage with a drumtype turret arranged on a lower bed, the tool changer having a ram that can move into the lathe with inclined bed and that has a double gripper head with two gripper arms arranged opposite to each other. Such tool changers are generally known.

For the automatic change of tools in lathes it is known to move a tool changer with two gripper arms into the tool machine. This tool changer holds in one of its gripper arms the new tool to be inserted and with its other gripper arm it can seize the tool that is to be exchanged. To effect the tool change as quickly as possible it is desirable that after having taken out the old tool the double gripper head with the two gripper arms only has to turn about a fixed angle to bring the new tool in alignment with the tool receiver which has become vacant after the old tool has been taken from it.

In most cases tool changers not only have to change external turning tools but also internal turning tools. To change the internal turning tools the gripper arms have to be able to seize the tools from the front of the drumtype turrets. The necessary movements which should take as little time as possible are difficult to carry out if the lathe has at least one tool carriage on the upper bed and one tool carriage on the lower bed.

The object of the invention is to develop a tool changer as described before in such a way that tools for the external as well as for the internal machining can be changed at all tool carriages in as little time as possible.

This object is reached according to the invention by the tool changer having a first guideway arranged parallel to the plane of the machine bed on which guideway a tool changer head is movable holding the double gripper head pivotable about an axis that is arranged rectangularly to the first guideway and thus to the plane of the machine bed, that the gripper arms are each arranged at the same distance to the axis of the double gripper head and at both sides of the axis and that the double gripper head is movable along its axis.

In such a tool changer the double gripper head turns in the plane of the inclined bed so that the gripper arms cannot collide with the inclined bed. By moving the tool changer head along the guideway that is arranged parallel to the inclined bed the double gripper head can be brought into a position above or below the lathe centre. The position below the lathe centre is used to change the external turning tools of an upper carriage or of several upper carriages whereas in the other position external turning tools of the tool carriage on the lower bed can be changed. In order to change the internal turning tools the double gripper head can be turned around its axis by 90 degrees to the aforementioned position so that by moving the carriages longitudinally (z-axis) to the lathe these tools can be taken away or inserted. The upper tool carriages can be served when the double gripper head is positioned above the lathe centre and the lower carriage when the double gripper head is positioned below the lathe centre.

The tool changer according to the invention has a broad variety of use. It serves to change internal turning tools as well as external turning tools in tool carriages on different beds. At the same time one can adapt to different tool systems without difficulty. In particular tools of the blocktool-system can be changed because of the movability of the double gripper head rectangular to the plane of the machine bed. This movability also allows to use the tool changer to change tools from a ledge-type magazine placed next to the lathe and to shift the individual ledges with tools by moving the double gripper head along its axis and rectangularly to the plane of the machine bed.

The movability of the double gripper head can easily be achieved if the tool changer head has a cylindrical guide rod arranged coaxially to the axis of the double gripper head on which the double gripper head is movable and pivotable around the longitudinal axis of the guide rod.

The movability of the double gripper head rectangular to the plane of the machine bed can also be achieved if the tool changer head is arranged on a slide on the first guideway and movable rectangularly to the guide direction of the first guideway.

The tool changer works particularly exact and without vibrations if it has a pin that in tool changing position projects into the chuck of the lathe and can be fixed there. This enables the tool changer to hold to the chuck during the tool changing.

The invention permits of numerous modifications. To further clarify its principle two of these are shown very schematically in the drawing and are described below. The drawing shows in FIG. 1 a side view on a tool changer and parts of a lathe with inclined bed, FIG. 2 a representation in perspective of a tool changer according to the invention but slightly different from the one shown in FIG. 1, FIG. 3 a top view on the parts of the tool changer and the lathe with inclined bed that are essential for the invention during the change of an external turning tool from a drumtype turret of a tool carriage on the left side on an upper bed, FIG. 4 the arrangement as in FIG. 3 during the change of an external turning tool from a drumtype turret of a tool carriage on the right side on an upper bed, FIG. 5 the arrangement according to FIG. 3 during the change of an external turning tool from a drumtype turret of a tool carriage on the lower bed, FIG. 6 the arrangement according to FIG. 3 while a tool is taken out from a ledge-type magazine, FIG. 7 the arrangement according to FIG. 3 while an internal turning tool is taken out of the drumtype turret of an upper tool carriage on the right.

FIG. 1 shows a cross-section of a longitudinal beam of a gantry 1 running in the usual way in longitudinal direction over a lathe. On the longitudinal beam of a gantry 1 there is a numerical controlled trolley 2 with a ram 3 pointing downwards. This ram 3 can be moved upwards and downwards which is illustrated by a double-arrow. At the bottom of the ram 3 there is a tool changer 4.

In FIG. 1 a line schematically shows the plane of a machine bed 5 that is formed by the upper bed and lower bed not shown in this figure of a lathe with inclined bed. At the bottom part of the ram 3 a first guideway 6 of the tool changer 4 runs parallel to the plane of the machine bed 5. On this first guideway 6 a tool changer head 7 is movably arranged. In this embodiment it is placed on a slide 8 that is movable along the first guideway 6, the slide having guides 9 arranged rectangularly to the first guideway 6 in which the tool changer head 7 is movable rectangularly to the plane of the machine bed 5.

At its lower end the tool changer head 7 has a double gripper head 10 that is pivotable about an axis 11 arranged vertically to the plane of the machine bed 5. The double gripper head 10 has two gripper arms 12, 13 arranged opposite to each other which are two pairs of pliers. The lathe centre 14 is also marked in FIG. 1. One sees that in FIG. 1 the tool changer head 7 is below the lathe centre 14 because it is driven to the lower end of the first guideway 6. In this position the double gripper head 10 is able to change a tool 15 that is held by a tool holder 16 of a not shown carriage on an upper bed of the lathe. If the tool changer head 7 is moved on the first guideway 6 to its other end position then it is above the lathe centre 14 and is then in a position to change a tool 17 marked in broken lines of a tool holder on a carriage of a lower bed of the lathe.

In FIG. 1 there is also shown a ledge-type magazine 18 which is placed next to the lathe. This ledge-type magazine 18 can also be served by the tool changer 4 if the tool changer head 7 is below the lathe centre 14 and the numerical controlled trolley 2 has before been moved into the position of the ledge-type magazine.

Figure 2:
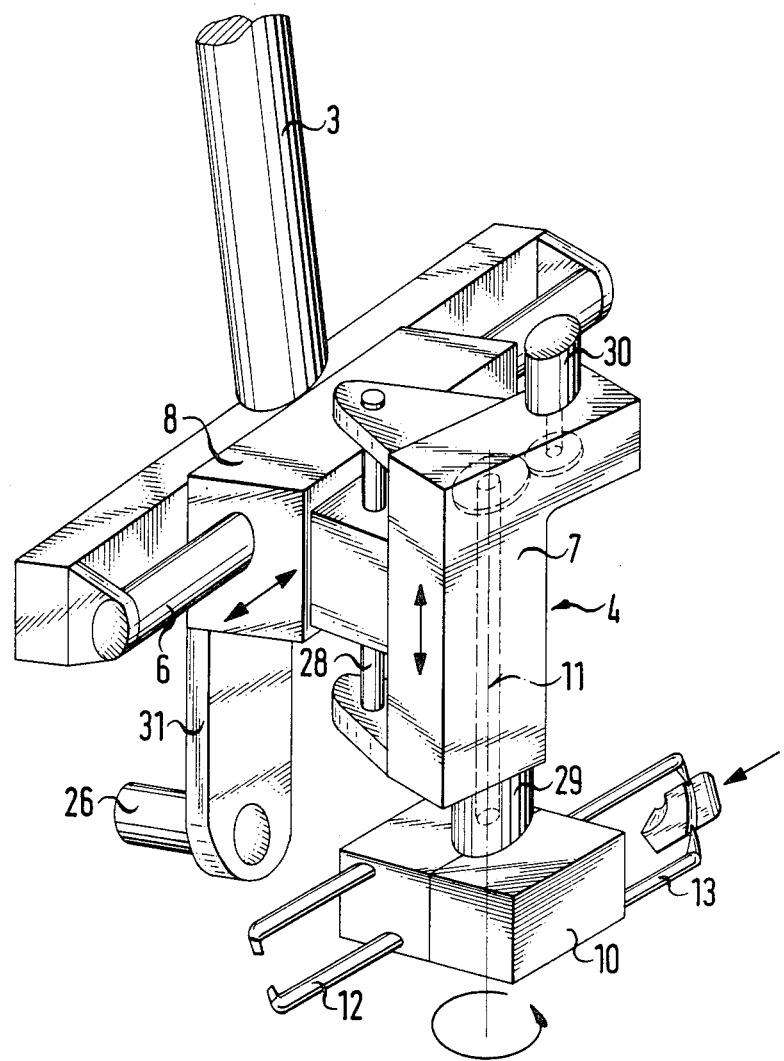

FIG. 2 shows the structure of the tool changer 4. One can see the lower end of the ram 3 with the first guideway 6. It is a non-rotable cylindrical guide rod. On the first guideway 6 there is the slide 8. The tool changer head 7 has a cylindrical guide rod 28 which runs rectangularly to the plane of the machine bed and is guided in the slide 8. Thus the tool changer head 7 can move rectangularly to the plane of the machine bed. In this embodiment the double gripper head 10 is arranged on a quill 29 which is pivotable around the axis 11 that runs rectangularly to the plane of the machine bed. A servomotor 30 at the upper end of the tool changer head 7 serves to pivot the double gripper head 10 about this axis 11.

FIG. 2 also shows that the gripper arms 12, 13 of the double gripper head 10 are arranged at the same distances and on opposite sides of the axis 11. This means that if the double gripper head 10 turns by 180 degrees the gripper arm 12 reaches the position where before there has been the gripper arm 13.

Important for the invention is a pin 26 pointing away from the tool changer head 7 and arranged at an arm 31 pointing downwards of the ram 3. This pin 26 can be fixed into the chuck of the lathe when the tool changer 4 has moved into the lathe. This keeps the tool changer 4 in an exact and non-vibrating position during the tool change.

Figure 3:
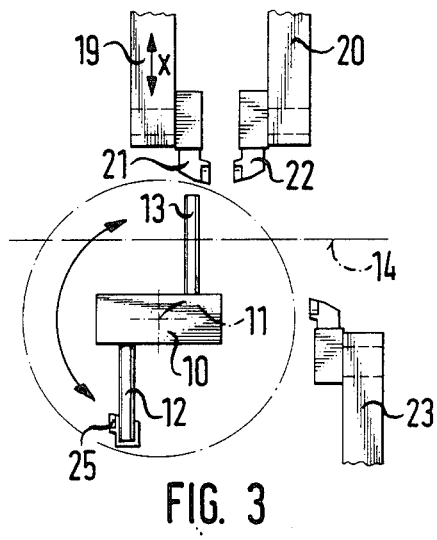

FIG. 3 schematically shows two drumtype turrets 19, 20 of a lathe that each have an external turning tool 21, 22. These drumtype turrets 19, 20 are each to be positioned on carriages of an upper bed of the lathe. FIG. 3 also shows a drumtype turret 23 with an external turning tool 24. This drumtype turret 23 is to be arranged on the lower bed of the lathe. Also shown is the double gripper head 10 with its two pairs of pliers forming the gripper arms 12, 13. It can be seen that the gripper arms 12, 13 are arranged at the same distance from the axis 11 of the double gripper head 10. In FIG. 3 the lathe centre 14 is also shown which runs above the double gripper head 10. In the position according to this figure the gripper arm 13 is able to seize the external turning tool 21 if the corresponding carriage moves in x-direction and thus towards the double gripper head 10. After having seized the external turning tool 21 the double gripper head 10 pivots about its axis 11 until the gripper arm 12 with a new tool 25 aligns with the corresponding tool receiver of the drumtype turret 19.

Figure 4:
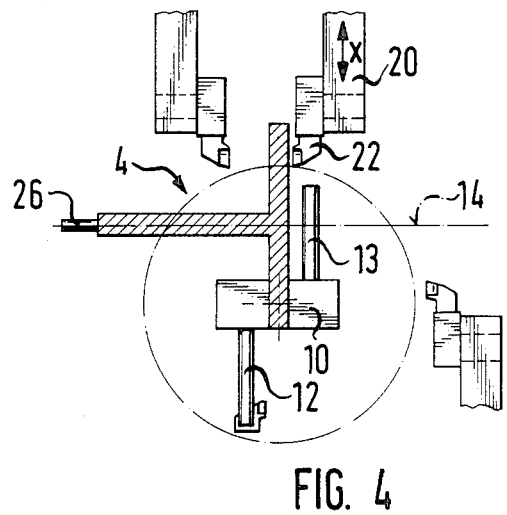

FIG. 4 shows the double gripper head 10 when changing external turning tools of the drumtype turret 20 to be seen on the right side in the drawing. Compared to FIG. 3 the slides have moved further to the left on the upper bed to align the gripper arms 12, 13 with the tools of the drumtype turret 20 on the right.

A further detail shown in FIG. 4 is the pin 26 at the tool changer 4. As mentioned before this pin 26 can be clamped into the chuck of the lathe not shown in the drawing while the tool changer is working. This holds the tool changer in an exact position and avoids vibrations while it is working.

Figure 5:
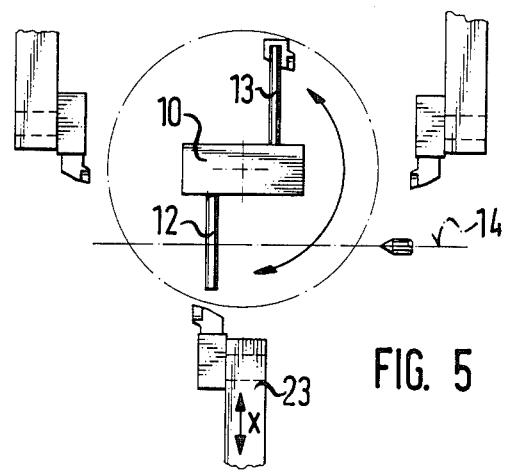

In FIG. 5 the double gripper head 10 has moved above the lathe centre 14. In this position its gripper arms 12, 13 can serve the drumtype turret 23 on the lower bed of the lathe.

Figure 6:
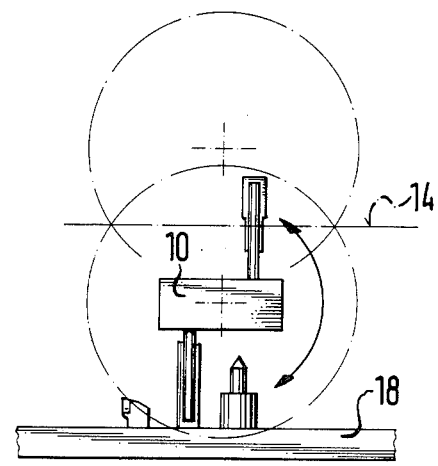

FIG. 6 shows how the double gripper head 10 can serve the ledge-type magazine 18 if the double gripper head 10 is below the lathe centre 14.

Figure 7:
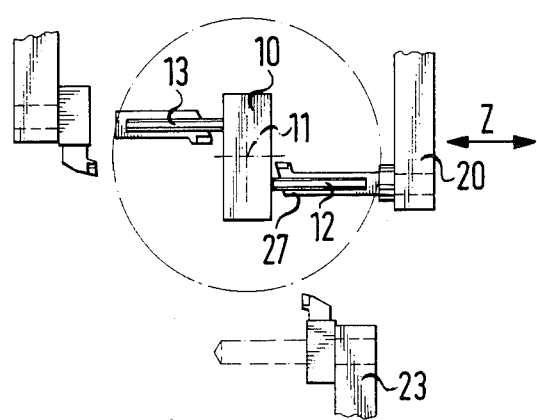

In FIG. 7 the double gripper head 10 is positioned above the lathe centre 14 but compared to its former positions it is turned by 90 degrees around its axis 11 which is pointing towards the plane of the machine bed 5. This enables the double gripper head 10 to change with its gripper arms 12, 13 internal turning tools 27 of the drumtype turret 20 on the right. In order to change internal turning tools of the drumtype turret 23 on the lower bed the tool changer head 7 only has to travel downwards on the first guideway 6 until the double gripper head reaches the position below the lathe centre 14 as for example shown in FIG. 6.

I claim:

1. Tool changer for a lathe with inclined bed with at least one tool carriage with a drumtype turret arranged on an upper bed as well as another tool carriage with a drumtype turret arranged on a lower bed, the tool changer having a ram that can move into the lathe with inclined bed and that has a double gripper head with two gripper arms arranged opposite to each other, characterized in that the tool changer (4) has a first guideway (6) arranged parallel to the plane of the machine bed (5) on which guideway (6) a tool changer head (7) is movable holding the double gripper head (10) pivotable about an axis (11) that is arranged rectangularly to the first guideway (6) and thus to the plane of the machine bed (5), that the gripper arms (12, 13) are each arranged at the same distance to the axis (11) of the double gripper head (10) and at both sides of the axis (11) and that the double gripper head (10) is movable along its axis (11).

2. Lathe with inclined bed according to claim 1, characterized in that the tool changer head (7) has a cylindrical guide rod (28) arranged coaxially to the axis (11) of the double gripper head (10) on which the double gripper head (10) is movable and pivotable around the longitudinal axis of the guide rod (28).

3. Lathe with inclined bed according to claim 1, characterized in that the tool changer head (7) is arranged on a slide (8) on the first guideway (6) and movable rectangularly to the guide-direction of the first guideway (6).

4. Lathe with inclined bed according to any one of the aforementioned claims, characterized in that the tool changer (4) has a pin (26) that in tool changing position projects into the chuck of the lathe and can be fixed there.

* * * * *